Figure 2:
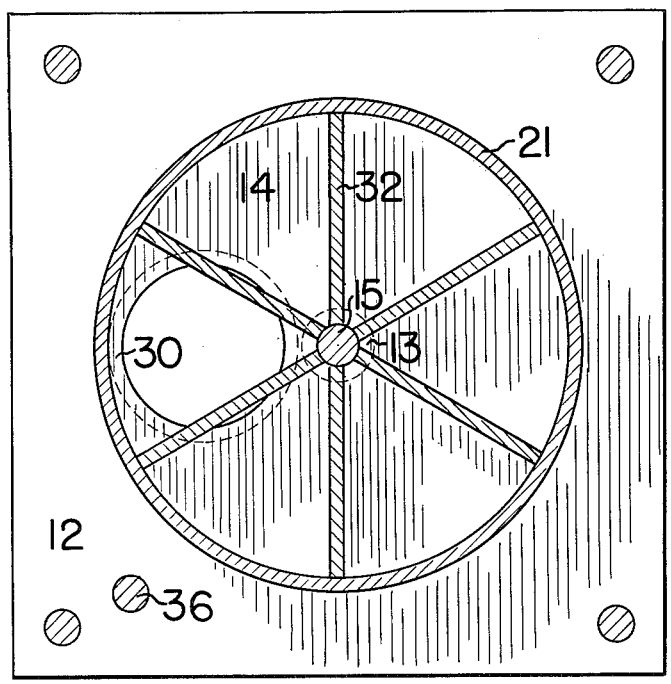

Dec. 7, 1965  G. W. DINGUS  3,221,949

CELL WHEEL ROTARY FEEDER

Filed May 21, 1962  2 Sheets-Sheet 1

INVENTOR.
GEORGE W DINGUS
BY

Dec. 7, 1965  G. W. DINGUS  3,221,949
CELL WHEEL ROTARY FEEDER
Filed May 21, 1962  2 Sheets-Sheet 2

G. W. DINGUS
*INVENTOR.*

United States Patent Office 3,221,949
Patented Dec. 7, 1965

3,221,949
CELL WHEEL ROTARY FEEDER
George W. Dingus, Pampa, Tex., assignor to Cabot Corporation, Boston, Mass., a corporation of Delaware
Filed May 21, 1962, Ser. No. 196,365
3 Claims. (Cl. 222—362)

This invention relates to improved apparatus for feeding substantially free-flowing powdered and granular products. More particularly this invention relates to an improved rotary type feeder especially useful in feeding granular or powdered products from one zone to another across a differential gas pressure without allowing uncontrolled or excessive flow of gas.

Various types of feeders are utilized today in handling free-flowing powdered or granular products such as flour, carbon black, cosmetics and the like. Included among such devices are those known to the art as rotating vane or pocket or simply vane feeders. Essentially, such devices comprise a number of pockets or segments formed by vanes mounted in radial fashion on a rotatable shaft. The feeder is installed between one chamber, hopper or other such container and another receptacle located directly beneath same. such as a bin, packer, sifter or the like. As the shaft about which the vanes are mounted revolves, an upper quadrant or pocket is filled with material from the top chamber or hopper. The material is carried around in the pocket and discharged at the lower quadrant into a suitable chamber or receptacle. For some applications, such a feeder is enclosed in a tight housing to permit delivery against pressure or vacuum and accordingly serves as an air or gas lock gate. This variant of the rotating vane or pocket type feeder is especially useful for feeding granular like products across spaces wherein there is a slight differential gas pressure since its use minimizes the hazards and inconvenience involved in handling finely divided dust like materials. In practice, however, many operational difficulties are encountered, especially in the use of present air lock type rotary feeders. These difficulties are generally attributed to the design and construction thereof. For example, extremely close tolerances must be maintained between the vane and the casing wall in order to provide a substantially gas tight seal there between. Close machined tolerances, especially on large pieces, are difficult, hence expensive, to maintain. Moreover, these clearances or tolerances are easily upset if the feeder temperature changes. In operation, the vane-wheel and the housing are exposed to somewhat different environments, and often will not change dimensions at the same rate during operation. Accordingly, the established clearance will either increase, causing substantial leakage, or decrease, causing "freezing up" of the rotating element. In order to compensate for this problem, some manufacturers of vane feeders have inserted flexible, replaceable blades—generally of neoprene—at the edges of the vane to insure essentially absolute sealing. However, such inserts are subject to rapid wear and are damaged by high temperature and considerable "down time" is often required in order to replace or repair such. Accordingly, a simple, inexpensive vane type feeder which is capable of continually insuring and maintaining a substantially air tight seal therein during the operation thereof would be a notable contribution to the art.

The principal object of the present invention is to provide a simple apparatus which is capable of transporting free-flowing powdered or granular products from one zone to another in a substantially gas tight fashion.

Other objects and advantages of the present invention will be obvious to those well skilled in the art or will appear hereinafter.

The above objects and advantages of my invention are realized by a novel arrangement of apparatus and a novel integration of the design features thereof to produce a rotary feeder which is surprisingly effective in transporting free-flowing products through a space across which there is a differential gas pressure.

Figure 1:
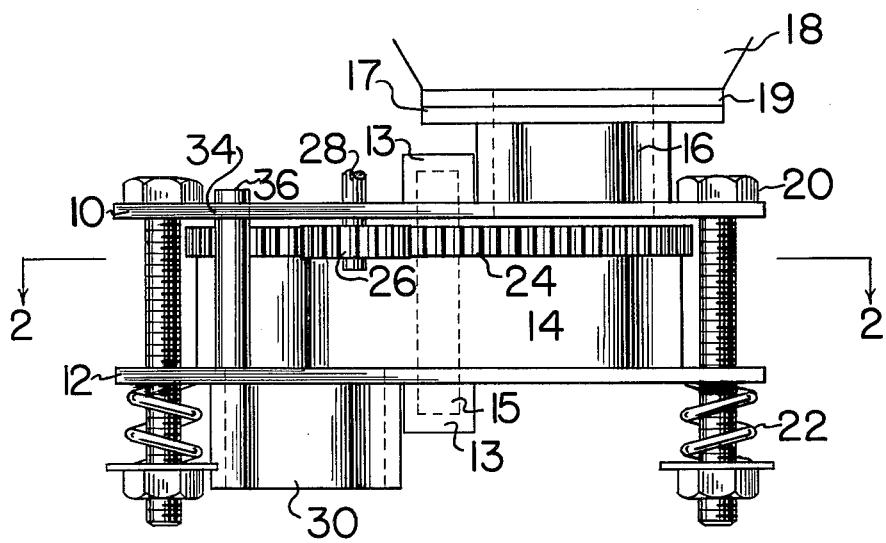
Figure 3:
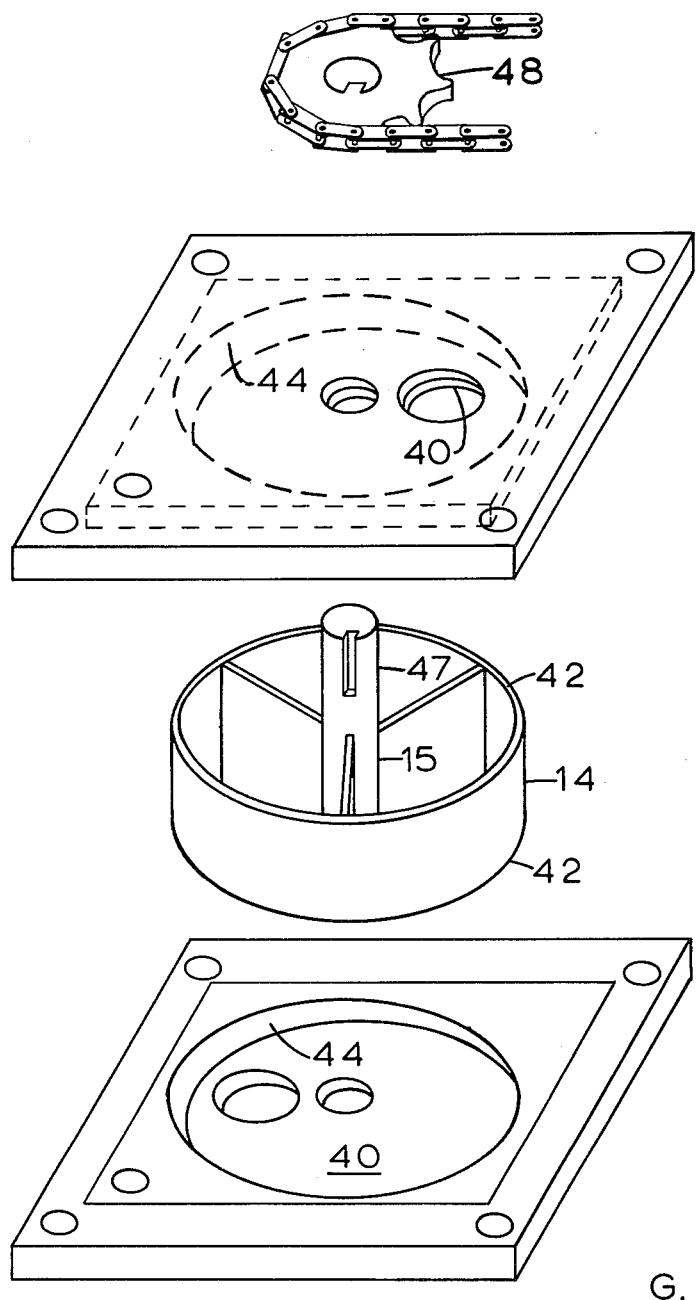

The novel features of my rotary feeder are best illustrated by the attached drawings in which FIGURE 1 is a schematic, partially cross-sectional view in elevation of an arrangement of apparatus representing an embodiment of my invention while FIGURE 2 is a plan view of the apparatus of FIGURE 1 taken along line 2—2 thereof. FIGURE 3 is a schematic exploded view of another embodiment of my invention.

Referring now to FIGURES 1 and 2, the apparatus illustrated therein comprises two horizontal plates 10 and 12 which are restrained together under compression such as by bolts 20 and springs 22 with the flat surfaces of the plates facing each other but with an intervening space therebetween. Each plate has a hole in a different off center position thereon. Attached securely to top plate 10 and communicating with the hole therein is a sleeve 16 extending upwardly therefrom. Sleeve 16 may be welded to plate 10 or attached in any manner so as to essentially form an integral part thereof. Sleeve 16 is attached securely to hopper 18 such as by bolting or welding mating flanges 17 and 19 together, thereby maintaining plate 10 in a fixed position. Bottom plate 12 is similar in structure to top plate 10 having sleeve 30 extending downwardly therefrom and in communication with the hole located therein in an off-center position which is out of line with the opening in the upper plate and preferably on the opposite side thereof as shown. Sleeve 30 is suitably connected (e.g., flexibly) in generally gas tight fashion to a storage bin (not shown) or other such receptacle. Accordingly, unlike plate 10 which is fixed, plate 12 is a floating plate and if desired or required a rotation stop such as a heavy pin 36 securely fixed to plate 12 and extending upward therefrom and extending slidably through a hole in plate 10 may be provided thereon. Alternatively, other such rotation stops or equivalents thereof may also be utilized. The plurality of bolts 20 which securely connect plate 10 to plate 12 are long enough so as to provide an intermediate space between the two plates equivalent to the height of the cell wheel and also long enough to accommodate springs 22 and maintain same under compression and bearing against plate 12. It is to be understood that more than the 4 bolts as illustrated may be utilized if desired. Moreover, other devices other than the bolts and spring arrangement illustrated may be utilized to restrain plates 10 and 12 together. In the apparatus illustrated, springs 22 which are under compression, constantly force plate 12 upwards toward plate 10 and against the bottom of cell wheel 14 which occupies the intervening space between said plates. Cell wheel 14, which may be considered as a vane wheel to which a complete integral outer rim 21 has been added, has a central axle 15 which should be long enough so that the terminal portions thereof extend into or through the central portions of plates 10 and 12. If said axle passes through either or both plates, some means for effecting a substantially gas tight seal where the axle passes therethrough should be provided such as bosses 13 as shown. Extending from axle 15 to the inner circumferential portion of cell wheel 14 in radial fashion are a series of vanes 32 of the same overall height as rim 21 of cell wheel 14. In the illustrated apparatus, a ring gear 24 completely encircles the rim 21 of cell wheel 14. Operationally connected with ring gear 24 is pinion gear 26 which is suitably driven through shaft 28, thus causing cell wheel 14 to rotate about axle 15 while in contact at top and bottom with plates 10 and 12 respectively. It will be readily apparent that by rotating the entire cell wheel 14, rather than merely the vanes as in commercial feeders, a substantially gas tight seal is continually provided and maintained between the bottom flat surface of plate 10 and the top surface of cell wheel 14 on one hand and between the top flat surface of plate 12 and the bottom surface of cell wheel 14 on the other. Accordingly, the apparatus of our invention provides a substantially gas tight system through which the powdered material from hopper 18 may be readily and continually transported to another zone with a minimum of inconvenience and without the hazards attendant such transport of such materials.

It will be seen that my feature of forming the gas tight seal at the flat upper and lower surfaces of cell wheel 14 with the aid of the spring loaded bottom plate 12 simplifies the maintenance of said seal while obviating the possibility of freeze-ups which often occur in present commercial rotary feeders wherein the seal is made at the outer edge of the rotating vanes. Moreover, the need of any special insert at the sealing edges of the vanes is also obviated. The number of vanes 32 may vary with the minimum being 3. When only 3 vanes are used they should be positioned so that the angles formed by adjacent vanes about axle 15 are about 120°. Also, the minimum distance between the circumferential portions of the off center holes should be at least equal to the maximum distance between two adjacent vanes in order to prevent excessive cross leakage of pressure. Obviously, by varying the speed and height of wheel 14, the rate of feed through the system may be controlled over a wide range. Hole 34 on plate 10 is designed to accommodate rotation stop pin 36 in slip fit fashion.

Obviously, many incidental modifications may be made in the apparatus of the attached drawings without departing from the spirit and scope of my invention. For example, referring now to FIGURE 3, the flat surfaces 40 of plates 10 and 12, that is, the surfaces thereof which seal against the top and bottom surfaces 42 of cell wheel 14, may be coated with various materials such as graphite or Teflon or the like to improve sealing and reduce friction. The top and bottom surfaces 42 of cell wheel 14 may also be so coated. Also, the faces of flat surfaces 40 of plates 10 and 12 coated or otherwise may be machined so as to form depressions 44 therein of substantially the same diameter as the cell wheel so as to securely accommodate the cell wheel 14 therein during rotation thereof.

Many means and methods of rotating cell wheel 14 obvious to those well skilled in the art may be employed in the practice of the present invention. For example, rather than a gear ring 24 and pinion 26 as illustrated in FIGURES 1 and 2, a chain and sprocket drive as illustrated in FIGURE 3 would be suitable. Also, the axle 15 may be extended to form a shaft 47 to accommodate a drive sprocket of gear 48 as shown in FIGURE 3. In this case various means of insuring a substantially air tight seal at the point in plate 10 or 12 where shaft 47 extends therethrough may be utilized.

In the operation of the apparatus described in the attached drawings, the material in hopper 18 which may be carbon black, flour, or any other such dry powdered material is continually fed through the opening defined by sleeve 16 into the compartments formed by adjacent vanes 32 as the cell wheel 14 is rotated about axle 15. Generally, the differential pressure between hopper 18 and the other zone to which the material is transported is no greater than about one or two pounds per square inch. As the cell wheel rotates, the material deposited in each compartment from hopper 18 is carried about and is deposited into the receptacle beneath the opening defined by sleeve 30. In most cases, the receptacle to which the material is delivered is at atmospheric pressure. Thus, it will be obvious that the apparatus disclosed will continually transport a powdered material from one container to another in a substantially gas tight fashion without the possibility of any "freezing" of rotating parts with stationary parts. It will also be obvious that the gas tight seal in the apparatus is not only present initially but that the apparatus has inherent therein the means to adjust or compensate for any slight wear which may occur and thereby continually insures and maintains a gas tight seal therein throughout the course of its operation.

Having described my invention, what I declare to be new and desire to secure by U.S. Letters Patent is as follows:

1. Apparatus for transporting powdered material and the like between zones of differing pressure while minimizing gas flow between said zones comprising a substantially horizontally disposed, circular cell wheel having an integral and continuous outer circumferential rim, an integral central shaft extending somewhat above and somewhat below said rim and a plurality of radial rib vanes of substantially the same overall vertical height as said rim each extending in continuous fashion from said shaft to the inner portion of said circumferential rim, two parallel substantially horizontal plates located respectively immediately above and immediately below said cell wheel, each of said plates extending beyond the outer circumferential rim of said cell wheel and the central portion of each respective plate having a cavity therein designed to receive the respective terminal portion of said shaft without restricting rotational motion of said shaft, one of said plates being rigidly fixed in location while the other is floatably mounted and is vertically movable a substantial distance toward and away from said fixed plate and each plate having an opening therethrough in an off-center position with said openings in the respective plates being positioned substantially diagonal to each other, means to restrain said plates together including means to continually resiliently urge said plates toward one another and into contact with the respective upper and lower edges of the rim and vanes of said cell wheel and means to rotate said cell wheel about said central shaft.

2. The apparatus of claim 1 wherein the means to restrain said plates together comprises a plurality of bolts each of which is long enough to extend through portions of said plates and provide an intervening space therebetween equivalent to the overall height of said cell wheel and to accommodate a spring in a compressed position with said spring pressing against the outer surface of one of said plates.

3. The apparatus of claim 1 wherein the opposite adjacent faces of said plates are machined so as to provide a recess in the medial portion thereof the diameter of which said recess being substantially equal to the outer diameter of said cell wheel.

References Cited by the Examiner

UNITED STATES PATENTS

| | | | |
|---|---|---|---|
| 1,904,924 | 4/1933 | Nielsen | 222—370 X |
| 2,207,822 | 7/1940 | Rooney et al. | 222—370 X |
| 2,503,233 | 4/1950 | Hall | 222—370 X |
| 2,901,150 | 8/1959 | Matter | 222—370 |
| 3,080,074 | 3/1963 | Hornbostel | 222—370 X |

LOUIS J. DEMBO, *Primary Examiner.*

EVERETT W. KIRBY, *Examiner.*